United States Patent [19]

Schmidt

[11] Patent Number: 4,711,284

[45] Date of Patent: Dec. 8, 1987

[54] PNEUMATIC TIRE

[75] Inventor: Oskar Schmidt, Bruck an der Leitha, Austria

[73] Assignee: Lim Kunststoff Technologie Gesellschaft m.b.H., Kittsee, Austria

[21] Appl. No.: 719,758

[22] Filed: Apr. 4, 1985

[51] Int. Cl.$^4$ ............ B60C 9/00; B60C 1/00; B32B 27/40

[52] U.S. Cl. ............ 152/452; 152/453; 152/454; 152/510; 152/511; 152/525; 152/547; 152/555; 152/560; 156/117; 156/118; 156/125; 264/255; 264/331.11; 425/55

[58] Field of Search ............ 152/452–454, 152/510–512, 525, 545, 560, 564, 526, 539, 547, 548, 555, 558; 156/117, 123, 125, 242, 245, 290, 291, 397, 118; 264/255, 257, 259, 331.11; 425/110, 383, 500, 35, 49, 54, 55

[56] References Cited

U.S. PATENT DOCUMENTS

| | | | |
|---|---|---|---|
| 2,118,774 | 5/1938 | Cadwell | 152/454 |
| 2,698,042 | 12/1954 | Perkins | 152/510 |
| 4,277,295 | 7/1981 | Schmidt et al. | 156/117 |
| 4,336,833 | 6/1982 | Fuzioka et al. | 152/452 |
| 4,393,913 | 7/1983 | Grawey | 152/453 |

FOREIGN PATENT DOCUMENTS 1246471 9/1971 United Kingdom .

*Primary Examiner*—Donald E. Czaja
*Assistant Examiner*—Thomas Bokan
*Attorney, Agent, or Firm*—Karl F. Ross; Hebert Dubno

[57] ABSTRACT

A pneumatic tire produced of elastomers, especially cast or injection molded polyurethanes has an inner body in which a reinforcement is embedded and anchored by means of holding ropes. The inner body may be provided as a closed tubular body and is encased by an outer body which accommodates a belt and is outwardly provided with a tread. At its side walls, the outer body is provided with respective bead cores in which area, the inner body of the tire is connected to the outer body.

8 Claims, 6 Drawing Figures

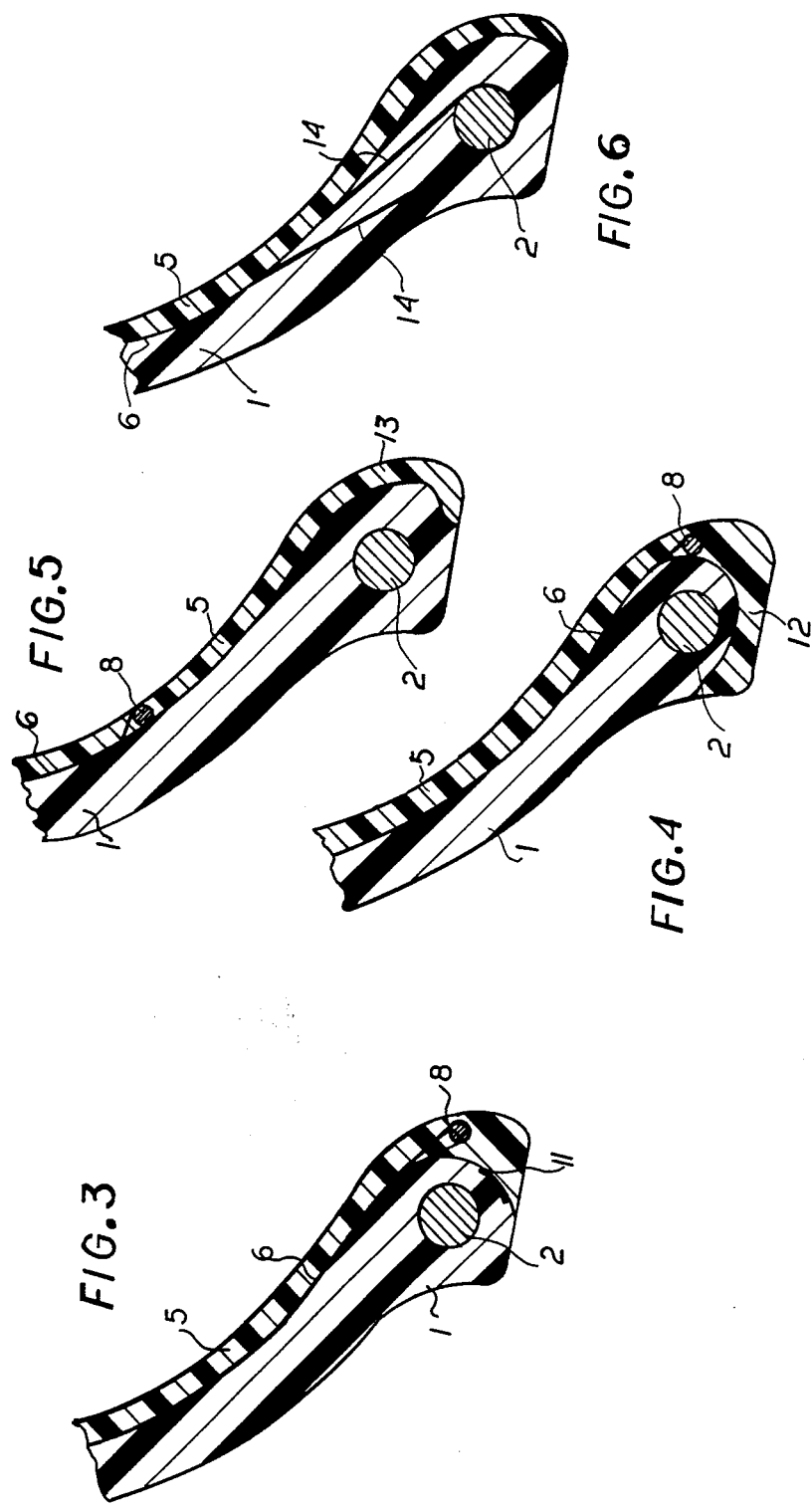

PNEUMATIC TIRE

FIELD OF THE INVENTION

My present invention relates to pneumatic tires composed of elastomeric materials, especially cast or injection molded polyurethanes.

BACKGROUND OF THE INVENTION

From the European Patent No. EP-B1-9018, there is known a method for producing a pneumatic tire in which a reinforcement is wound on an inner tire body or inner part of the carcass previously shaped on a mold core and anchored to respective beads by forming loops about the beads. Thereafter, the inner tire body is embedded in an outer tire body by casting or injection molding.

This known method is rather complicated as it requires a winding of the reinforcement about the mold core.

The British Patent GB-PS No. 1,246,471 discloses a method of casting a pneumatic tire in which a layer of parallel reinforced cords is sandwiched between two sheets and then formed into a cylinder. After adhering a bead core to one end of the cylinder and positioning the latter in a mold, the second bead core is attached and finally, liquid casting material is fed into the mold to form the tire. This method is also rather complicated.

OBJECTS OF THE INVENTION

It is thus the principal object of my present invention to provide an improved pneumatic tire obviating the afore-stated drawbacks.

SUMMARY OF THE INVENTION

I realize these objects according to the present invention by embedding a radial reinforcement in an inner tire body which is outwardly surrounded by an outer body and has a continuous contact surface with the latter whereby the inner body is connected to the outer body at least in vicinity of the bead cores and preferably in an at least partially releasable manner.

Preferably, as noted, the connection between the inner and the outer bodies is provided so as to be detachable, e.g. by an adhesive tape coated at its both sides or by extending the inner body with an U-shape end section into which the outer body may be snapped.

The method of the invention allows the winding of the reinforcement essentially in one plane, substantially in a plane or along a cylinder surface and thereafter the formation of the inner tire body by injection molding or casting the reinforcement to a band or ring. This means that the inner body is already provided with the reinforcement prior to shaping the tire on a mold core by embedding the inner body in an outer body.

Upon production of pneumatic tires which need not be provided with a radial reinforcement, it is possible to provide a polyurethane composition for the tire that can be adjusted in such a manner that the hardness and the modulus of elasticity of the material has optimum characteristics in various aspects. Because of other reasons to be considered, the inclusion of such a radial reinforcement within the tire body is, however, necessary. Since the reinforcement requires, on the other hand, a different hardness and ductility of the surrounding material in view of the necessity to withstand shear forces occurring during forming of the tire, compromises have had to be made in the past when it came to the selection of material in order to meet all requirements as far as possible. Needless to say that optimum characteristics for a tire to be produced in such a manner could not be obtained.

According to the present invention, it is possible after providing the reinforcement in a simple manner by winding it about two parallel holding struts, to embed the reinforcement within a material of lower modulus of elasticity and hardness and then to embed the so-formed inner body in an outer body by casting or injection molding whereby the outer body has a relatively higher modulus of elasticity and higher hardness than the inner body. Thus, the inner body is made of a material sufficiently soft to offset occurring shear forces while the outer body can be adjusted in its properties—either by selecting different materials or materials of different strength—in an optimum way to the requirements and prevailing conditions without concern as to the effect on the radial reinforcement.

The manufacturer of tires has now the means for the first time to provide the outer tire body with regard to material, material strength etc. essentially independently of the radial reinforcement. In this context, I should point out that the production of tires of elastomers with different hardness and different moduli of elasticity is certainly known per se. The surprising effect of my present invention is the possibility to provide the outer tire body with optimum characteristics without requiring any compromises because of the radial reinforcement. It has been found to be advantageous to provide a modulus of elasticity of less than 100 N/cm$^2$ for the inner body (preferably less than 50 N/cm$^2$) and a Shore-A hardness less than 80 (preferably 55 to 65) while the Shore-A hardness of the outer body is greater than 81 and the modulus of elasticity is greater than 120 N/cm$^2$, preferably 170–190 N/cm$^2$. The modulus is given for a temperature of 20° C. and 5% elongation.

BRIEF DESCRIPTION OF THE DRAWING

The above and other objects, features, and advantages of my present invention will become more readily apparent from the following description, reference being made to the drawing in which:

FIGS. 3 and 4 show two different principles of connecting an inner tire body to an outer tire body;

FIG. 5 is a cross-sectional view of a third embodiment of a tire according to the invention; and FIG. 6 is a cross-sectional view of a fourth embodiment of a tire according to the invention.

SPECIFIC DESCRIPTION

Figure 1:
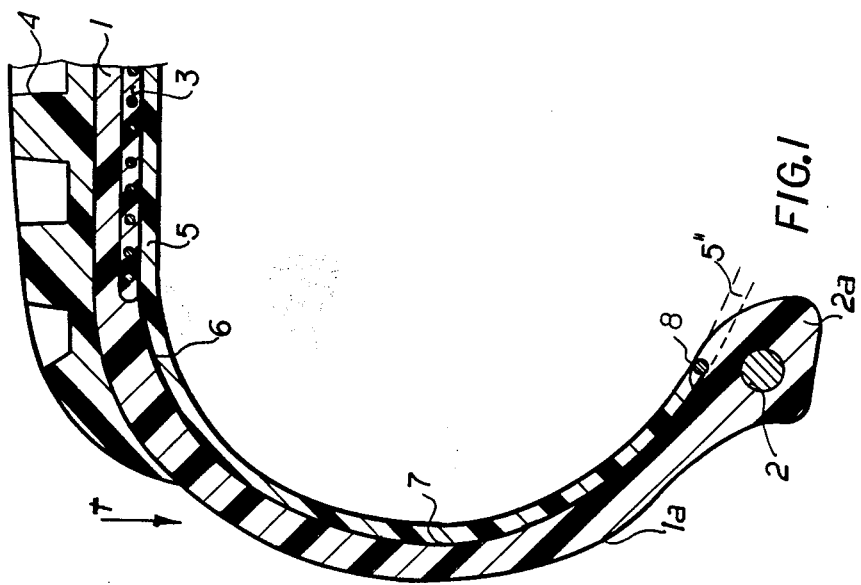
FIG. 1 is a cross-sectional view of a first embodiment of a pneumatic tire according to the invention.

In FIG. 1, T generally designates a pneumatic (e.g. tubeless) tire which includes an outer body 1 or carcass with a profiled tread 4 along a central portion of its outer circumference, and side walls 1a. Embedded within the outer body 1 at a distance below the tread 4 is a belt 3 which generally improves the driving quality of the tire T. The side walls 1a are provided along its inner circumference, with beads 2a which accommodate bead cores 2 to provide a connection with a respective rim of a wheel not shown. Arranged beneath the outer body 1 is a thin inner body 5 which includes a reinforcement 6 consisting of a cord 7 which is anchored via bead ring-like holding ropes 8.

The manufacture of the tire T is provided in the following way: The cord 7 is wound in a zigzag manner about two holding ropes, wires or studs 8 extending parallel to each other at a predetermined distance so as to provide a plane or cylindrical web. Thereafter, the web which constitutes the reinforcement 6 is embedded within a material by injection molding or casting so that a band or a ring is shaped which forms eventually the inner body 5.

The so-formed inner body 5 is placed on an inflatable form core (not shown) and molded or cast with the outer body 1 after mounting the bead cores 2 and the prefinished belt 3 so that the inner body 5 is surrounded by and is in continuous surface contact with the outer body 1.

As material for the tire T, elastomers, especially cast or injection molded polyurethanes are used whereby the inner body 5 of the tire T is produced of a material which has a lower modulus of elasticity and a lower hardness than the outer body 1. In particular, the inner body 5 is provided with a modulus of elasticity less than 100 N/cm$^2$, preferably less than 50 N/cm$^2$ and with a Shore-A hardness (measured with a Shore durometer of type A) less than 80, preferably 55 to 65. The modulus of elasticity of the outer body 1 is more than 120 N/cm$^2$ and is preferably within the range of 170 to 190 N/cm$^2$ while its Shore-A hardness is at least 81. The stated values for the modulus of elasticity are based at a temperature of 20° C. and 5% expansion.

As is further indicated in FIG. 1, the inner body 5 of the tire T is provided as continuous tubular body 5" whereby the radial reinforcement 6 extends only in the area of the outer body 1.

During attachment of the inner body 5 of the tire T onto the form core, expansions are caused within the inner body 5. These expansions are prevented in the embodiment according to FIG. 2 in which an inner body 5' is shown which is injection molded or cast onto the reinforcement 6. In contrast to the embodiment of FIG. 1, the reinforcement 6 after being produced in the manner as previously described is at first attached to the form core and thereafter the inner body 5' is molded thereon. The reinforcement 6 which is thus essentially surrounded by the inner body 5' extends inwardly and is exposed toward the interior of the tire T. Then, the outer body 1 is connected thereto and a belt 3' is wrapped onto the latter prior to injection molding the tread 4. The belt 3' which in this embodiment is not prefinished may also be wrapped around the inner body 5'.

Figure 2:
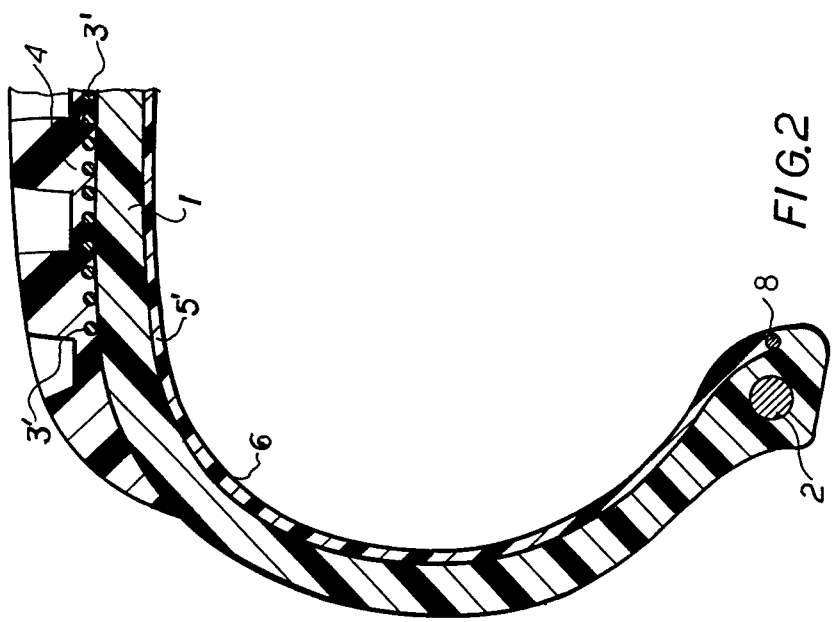
FIG. 2 is a cross-sectional view of a second embodiment of a tire according to the invention.

In the embodiments of FIGS. 1 and 2, the inner body 5, 5' can be connected to the outer body 1 along the entire contact area therebetween. It is, however, also feasible to provide the connection between the inner body 5,5' and the outer body 1 only in the area of the bead cores 2, preferably in a detachable manner as this is shown in FIG. 3. Accordingly, an adhesive film, e.g. a double-backed adhesive tape 11 which is provided with an adhesive coat at its both sides, is interposed between the outer body 1 and the inner body 5 in the region of the bead cores 2.

An alternative to the use of the interposed adhesive film 11, a detachable connection between the inner body 5 and the outer body 1 is obtained by integrally extending the inner body 5 with a U-shaped end portion 12, as illustrated in FIG. 4. In this embodiment, the outer body 1 snaps into the end portion 12 which thus surrounds essentially the respective radially inward portion of the outer body 1.

In contrast to the embodiments of FIGS. 3 and 4 in which the holding cords 8 for retaining the reinforcement 6 are provided in vicinity of the bead cores 2, the embodiment of FIG. 5 shows that the holding cords 8 are arranged at an increased distance to the core 2 so that the inner body 5 is provided with the reinforcement 6 only along a major portion of the outer body 1. The non-reinforced portion of the inner body 5 ends in a U-shaped end section to allow snapping of the outer body 1 and connection to the inner body 5.

Turning now to FIG. 6, which illustrates a further embodiment of the tire T. Accordingly, the inner body 5 is provided with a reinforcement 6 whose end sections 14 extend outwardly beyond the inner body 5 and are wrapped and anchored directly around the respective bead cores 2. In this embodiment, the holding cords 8 as required in the previously described embodiments are omitted.

I may note that further modifications of the pneumatic tire are possible which are within the scope of the present invention.

For example, the connection of the radial reinforcement 6 to the holding ropes 8 or bead cores 2 can be provided by forming loops as described in the European patent No. EP-B1-9018. In addition, the material of the reinforcement 6 and of the bodies 1,5 of the tire T can be coordinated depending on the requirements.

I claim:

1. A reinforced side wall pneumatic tire comprising:
    an outer elastomeric tire body having a tread along its outer periphery, opposing side walls adjoining said tread, and respective beads along inner peripheries of said side walls;
    a bead core embedded in each of said beads;
    an inner elastomeric body embedded in said outer body along said tread and said side walls and in continuous contact therewith, the elastomer of said inner elastomeric body having a hardness and modulus of elasticity which are each less than the hardness and modulus of elasticity of the elastomer of said outer elastomeric body;
    a radial reinforcement embedded in said inner body and thereby incorporated in the tire as the side wall reinforcement thereof; and
    anchor elements embedded in said inner elastomeric body proximal to said beads and around which said radial reinforcement is looped.

2. A tire as defined in claim 1 wherein said outer elastomeric tire body and said inner elastomeric body are each made of a polyurethane.

3. A tire as defined in claim 1 wherein at a temperature of 20° C. and an expansion of 5%, the modulus of elasticity of said inner elastomeric body is less than 100 N/cm$^2$ and the hardness thereof indicated as Shore-A hardness is less than 80.

4. A tire as defined in claim 3 wherein the modulus of elasticity of said inner elastomeric body is less than 50 N/cm$^2$ and the Shore-A hardness of said inner elastomeric body is 55 to 65.

5. A tire as defined in claim 3 wherein the modulus of elasticity of said outer elastomeric tire body is higher than 120 N/cm$^2$ and its hardness indicated as Shore-A hardness is at least 81.

6. A tire as defined in claim 5 wherein the modulus of elasticity of said outer elastomeric tire body is 170 to 190 N/cm$^2$.

7. A tire as defined in claim 1 wherein said inner elastomeric body is a closed tubular body.

8. A tire as defined in claim 1 wherein said anchor elements are annular holding cords.

* * * * *